United States Patent
Suresh et al.

(10) Patent No.: US 12,399,703 B2
(45) Date of Patent: Aug. 26, 2025

(54) PARALLEL MULTI-RACK DATAPLANE UPGRADES

(71) Applicant: VMware LLC, Palo Alto, CA (US)

(72) Inventors: Prashanth Suresh, San Jose, CA (US); Sushil Shripal Munot, Santa Clara, CA (US); Shyama Sankar Vellore, Mountain View, CA (US); Rucha Rajurkar, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 181 days.

(21) Appl. No.: 18/315,899

(22) Filed: May 11, 2023

(65) Prior Publication Data

US 2024/0378044 A1  Nov. 14, 2024

(51) Int. Cl.
| | |
|---|---|
| G06F 9/48 | (2006.01) |
| G06F 8/65 | (2018.01) |
| G06F 8/656 | (2018.01) |
| G06F 9/50 | (2006.01) |
| G06F 8/61 | (2018.01) |
| G06F 8/71 | (2018.01) |
| G06F 9/455 | (2018.01) |

(52) U.S. Cl.
CPC .................. *G06F 8/65* (2013.01); *G06F 8/63* (2013.01); *G06F 8/656* (2018.02); *G06F 8/71* (2013.01); *G06F 9/45558* (2013.01); *G06F 9/4881* (2013.01); *G06F 9/5027* (2013.01); *G06F 9/5077* (2013.01)

(58) Field of Classification Search
CPC ... G06F 8/65; G06F 8/656; G06F 8/71; G06F 8/63; G06F 9/4881; G06F 9/5027; G06F 9/45558; G06F 9/5077
See application file for complete search history.

(56) References Cited

U.S. PATENT DOCUMENTS

| | | | |
|---|---|---|---|
| 2019/0220271 A1* | 7/2019 | Olderdissen | ........ G06F 9/45558 |
| 2020/0201665 A1* | 6/2020 | Panse | ..................... G06F 9/5077 |

(Continued)

OTHER PUBLICATIONS

Vijayaraghavan Soundararajan et al., The Impact of Management Operations on the Virtualized Datacenter, Jun. 19-23, 2010, [Retrieved on Mar. 12, 2025]. Retrieved from the internet: <URL: https://dl.acm.org/doi/pdf/10.1145/1816038.1816003> 12 Pages (326-337) (Year: 2010).*

*Primary Examiner* — Anibal Rivera
(74) *Attorney, Agent, or Firm* — King Intellectual Asset Management

(57) ABSTRACT

Examples described herein include systems and methods for parallel upgrades of multiple hosts within an on-premises, multi-rack software-defined data center ("SDDC"). Upgrade instructions can be provided to a point-of-presence ("POP") virtual machine ("VM") of the SDDC, which can call an application programming interface ("API") of a pod service executing on a control plane VM in the SDDC. For example, the pod service can generate a set of instructions for performing cluster upgrades in parallel. In one example, the pod service provides the instructions to a lifecycle management service executing on a VM of the SDDC, such as the control plane VM. In some examples, the lifecycle management service can add a spare host to a cluster of hosts in order to begin upgrading one or more hosts in that cluster. This can be performed in parallel, using the spare hosts from different racks simultaneously.

20 Claims, 6 Drawing Sheets

(56) References Cited

U.S. PATENT DOCUMENTS

2023/0095814 A1* 3/2023 Sarkar ................ G06F 11/1451
                                                  707/641
2023/0289216 A1* 9/2023 Agrawal ............... G06F 9/4881

* cited by examiner

PARALLEL MULTI-RACK DATAPLANE UPGRADES

BACKGROUND

Although cloud computing continues to rapidly gain in popularity and market share, physical datacenter hardware is still required in certain circumstances. For example, a business with highly sensitive data might choose to utilize a physical datacenter at the business location, also known as an "on-premises" datacenter. In another example, a remote edge location such as a cell tower might not have the necessary internet access to rely on a cloud-based datacenter. In these examples and others, a physical, on-premises datacenter is required.

These datacenters can be software-defined data centers ("SDDCs"), which use software to abstract and automate the management of infrastructure resources such as compute, storage, and networking. An SDDC typically consists of several layers of software, including virtualization software to abstract compute resources, software-defined storage to manage storage resources, and software-defined networking to manage network resources. These layers are managed through a centralized management platform.

Physical SDDCs typically include multiple data center racks, also known as server racks. A rack generally refers to a grouping of servers and/or networking equipment that typically reside in a common physical frame. For example, based on a customer's datacenter requirements, they may order multiple racks of servers with which to construct an SDDC.

Various components of an SDDC, such as the data plane components, need to be upgraded over time to maintain performance. Data plane components can be any components within the SDDC architecture that handle the movement and processing of data between applications and infrastructure, performing tasks such as processing and forwarding network traffic, storing and retrieving data, and executing compute tasks. Example SDDC components that are considered part of the data plane can include: compute resources (the virtual machines ("VMs") or containers that execute applications and services); storage resources (the storage devices that store data and provide data services such as backup, replication, and encryption); network resources (the network devices that handle traffic and provide network services such as load balancing, security, and segmentation); hypervisors or virtualization software (the software that creates and manages VMs and virtualizes compute and storage resources); and automation and orchestration software (the software that automates the deployment, configuration, and management of infrastructure resources and applications).

To upgrade these various components, each host, or server, of the SDDC may need to be upgraded. Generally, each server rack includes one spare host that can be used during upgrades. Data residing on a host needing upgrades can be migrated to the spare host until the upgrade is complete, after which the data can be moved back to the upgraded host. However, today's on-premises SDDCs can only upgrade one host at a time regardless of how many racks or spare hosts are in the SDDC. This means that for a 10-rack datacenter with 10 spare hosts, for example, only one of those spare hosts can be used at any given time for upgrades. This limitation makes upgrades extremely time consuming.

As a result, a need exists for systems and methods for more efficiently upgrading an on-premises, multi-rack SDDC. In particular, a need exists for systems and method for parallel upgrades of multiple hosts within an on-premises, multi-rack SDDC, without impacting customer resources or workloads.

SUMMARY

Examples described herein include systems and methods for parallel upgrades of multiple hosts within an on-premises, multi-rack SDDC. In an example method, upgrade instructions can be provided to a point-of-presence ("POP") VM. The POP VM can be deployed at a location where network traffic is exchanged between the SDDC and different networks, such as a management service or backend that provides instructions and upgrades to the SDDC. The management service can generate instructions for a data plane upgrade job and send it to the SDDC by way of the POP VM.

The POP VM can call an application programming interface ("API") of a pod service executing on a management VM (also referred to herein as a control plane VM) in the SDDC. The pod service can include logic for parsing instructions and coordinating specific actions within the SDDC to carry out those instructions. For example, the pod service can generate a set of instructions for performing cluster upgrades in parallel. The instructions can identify multiple clusters, where each cluster includes multiple hosts, and where each cluster is located on a separate data center rack. The pod service can then provide the instructions to the components responsible for carrying them out to perform the upgrades.

In one example, the pod service provides the instructions to a lifecycle management service executing on a VM of the SDDC, such as the management VM. The pod service can invoke APIs of the lifecycle management service to accomplish this. For example, the pod service can generate multiple sets of parallel instructions for performing various upgrades and can invoke multiple APIs of the lifecycle management service in parallel for each of the instruction sets.

In some examples, the lifecycle management service can add a spare host to a cluster of hosts in order to begin upgrading one or more hosts in that cluster. This can be performed in parallel, using the spare hosts from different racks at the same time. For example, a first spare host from a first rack can be added to a cluster executing on the first rack, while a second spare host from a second rack can be added to a cluster executing on the second rack. The lifecycle management service can cause data to be transferred from one or more hosts of each cluster to the spare host added to that cluster. After being backed up using the spare host, the hosts can be taken offline for upgrades.

Upgrades can include upgrading the software, firmware, or both, of the offline hosts. In some examples, the software upgrades are provided by the lifecycle management service directly, such as by providing upgrade files and instructions for applying the upgrade files to multiple offline hosts on different racks. This can cause the offline hosts to upgrade themselves at the same time, using different spare hosts on the different racks.

In some examples, the lifecycle management service can instruct one or more hardware security modules to perform the firmware upgrades. In one example, each cluster includes a firmware manager VM executing in that cluster. Each firmware manager VM can include a hardware security module. To perform parallel firmware upgrades, the lifecycle management service can provide parallel instructions to hardware security modules associated with each cluster to which a spare host has been added. Each hardware security module can perform the firmware upgrades one or more hosts within the same cluster as the firmware manager VM.

The method can also include bringing the offline hosts back online. When all hosts in a cluster have been upgraded, or when the upgrade instructions have otherwise been completed, the spare host can be removed from that cluster. The process can then repeat for other clusters as appropriate.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for parallel upgrades of multiple hosts within an on-premises, multi-rack SDDC. Upgrade instructions can be provided to a POP VM of the SDDC, which can call an API of a pod service executing on a control plane VM in the SDDC. For example, the pod service can generate a set of instructions for performing cluster upgrades in parallel. In one example, the pod service provides the instructions to a lifecycle management service executing on a VM of the SDDC, such as the control plane VM. In some examples, the lifecycle management service can add a spare host to a cluster of hosts in order to begin upgrading one or more hosts in that cluster. This can be performed in parallel, using the spare hosts from different racks simultaneously.

Figure 1:
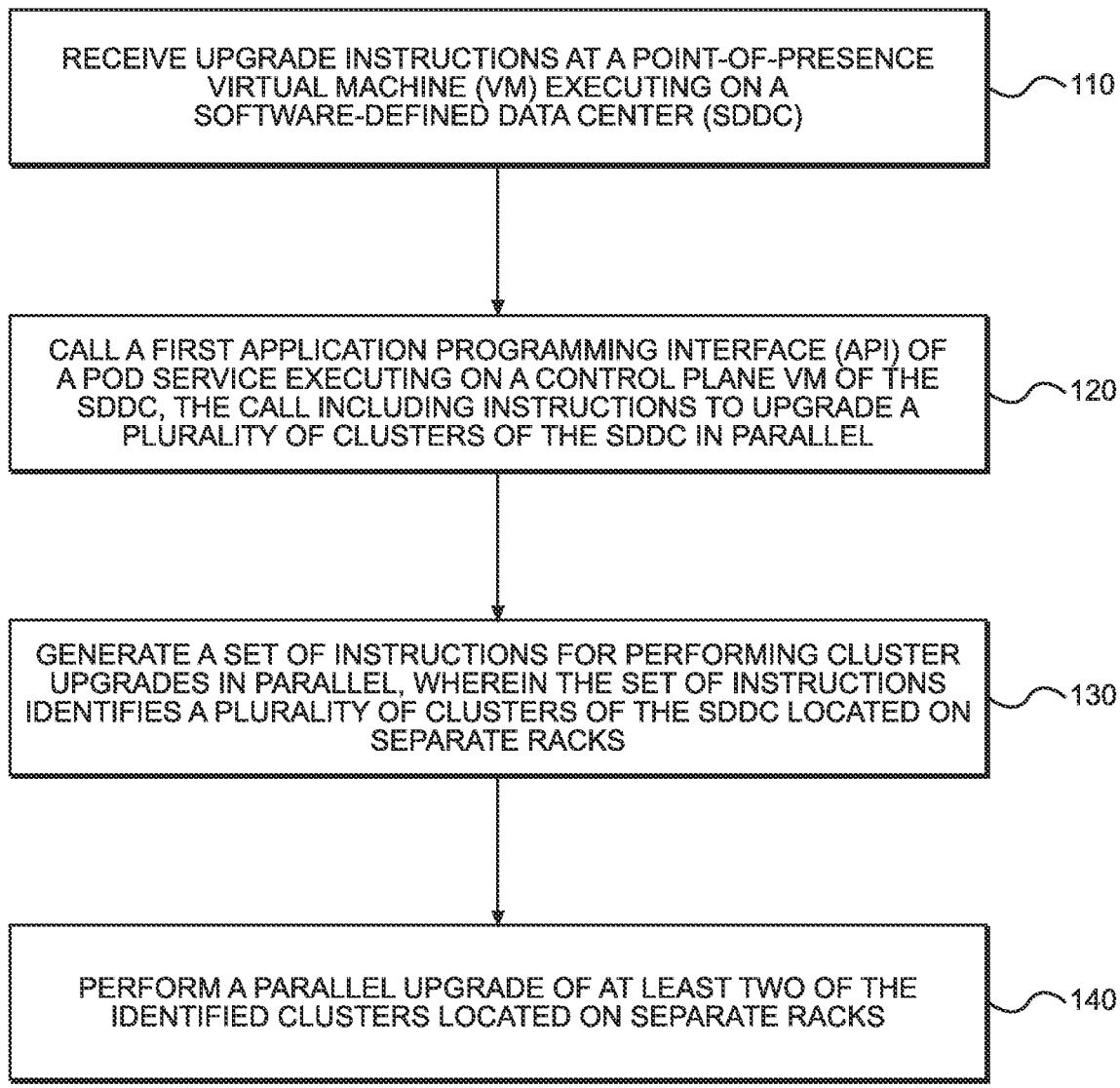
FIG. 1 is a flowchart of an example method for parallel upgrades of multiple hosts within an on-premises, multi-rack SDDC.

FIG. 1 provides a flowchart of an example method for parallel upgrades of multiple hosts within an on-premises, multi-rack SDDC. At stage 110, a POP VM executing on the SDDC receives upgrade instructions from a cloud backend. The POP VM can be deployed at a strategic location in the SDDC infrastructure to optimize network performance and reduce latency by providing a local presence for network services. It can act as a gateway or hub for network traffic, such as instructions provided by a cloud backend. The POP VM can provide services such as caching, load balancing, and content delivery to optimize network traffic and improve the user experience. It can also provide security functions such as intrusion detection and prevention, firewalls, and VPN gateways to secure network traffic.

The POP VM can poll a cloud backend for instructions. In some examples, the POP VM polls at regular intervals, but it can also poll in response to a notification received at the POP VM. The cloud backend can be a remote server or group of servers that provides backend services to the SDDC. In some examples, the cloud backend is operated by a third party different from the customer running the SDDC itself.

The instructions received at stage 110 can include instructions to upgrade the SDDC. For example, the instructions can identify specific software and/or firmware upgrades to be applied. In some examples, the instructions include one or more upgrade files. In another example, the instructions provide a location, such as a uniform resource locator ("URL"), where the upgrade files are stored. The POP VM, or any other appropriate component of the SDDC, can then retrieve the upgrade files from the URL. The instructions can also include an identification of specific components in the SDDC to be upgraded. For example, the instructions can identify particular racks, clusters, and hosts to be upgrade. They can also map each component to the specific upgrade to be applied. The instructions can also specify an upgrade order, including instructions to perform certain upgrades in parallel by applying them at the same time.

At stage 120, the POP VM can call a first API of a pod service executing on a control plane VM of the SDDC. The control plane VM can be a VM that is responsible for managing and controlling the networking and compute resources of the SDDC. It can provide the intelligence and orchestration necessary to manage and automate the deployment, configuration, and operation of virtualized resources. The control plane VM serves as the brain of the SDDC, responsible for managing the virtual network functions, virtual storage, and virtual compute resources. The control plane VM can run specialized software that provides a variety of functions, including resource allocation, load balancing, routing, and security. It communicates with other components in the SDDC, such as the VMs and hypervisors that manage them, to provide a comprehensive view of the virtualized infrastructure and ensure that resources are used efficiently.

The control plane VM can include a pod service, which can be a service executing on the control plane VM that can perform various functionality. In one example, the pod service includes API functionality such that another entity—in this example, the POP VM—can invoke one or more APIs to carry out the instructions received at stage 110. In one example, the POP VM parses the instructions from stage 110 into multiple instructions to be performed in parallel. In those examples, the POP VM invokes multiple APIs of the pod service at stage 120 to communicate the parallel instructions. In another example, the POP VM invokes a single API to provide the instructions as one package, and the pod service is responsible for breaking down the instruction set into discrete, parallel instructions.

At stage 130, the control plane VM can generate a set of instructions for performing cluster upgrades in parallel. The instructions can identify a plurality of clusters of the SDDC, such as multiple clusters operating on separate physical racks of the datacenter. In some examples, this stage is performed by the pod service of stage 120. In another example, the pod service invokes parallel APIs of a lifecycle management service that can also be executing on the control plane VM. The lifecycle management service can include functionality for performing upgrades, either directly or by instructing other components of the SDDC to perform the upgrades.

Stage 140 can include performing a parallel upgrade of at least two of the identified clusters located on separate racks. This stage can include software or firmware upgrades, or both. In some examples, the lifecycle management service can perform software upgrades directly. This can include moving spare hosts to the clusters to be upgraded. In some on-premises data centers, each physical rack ships with only one spare host. This host can be added to a cluster to be upgraded, allowing one or more other hosts of that cluster to be taken offline while the spare host temporarily takes over any available duties. In an example where the SDDC includes three separate racks, this stage can include adding a spare host to three clusters of the SDDC, with each cluster executing on a different rack relative to the other clusters. This can allow each cluster to be upgraded simultaneously, utilizing the spare hosts as efficiently as possible rather than performing the upgrades serially.

In some examples, the lifecycle management service can instruct other components to perform firmware upgrades. An example of such a component is a hardware security module executing on a manager VM. In some examples, a manager VM is located on each cluster and is configured to apply firmware upgrades. The lifecycle management service can therefore instruct multiple hardware security modules on the parallel clusters to perform firmware upgrades simultaneously. In some examples, these firmware upgrades occur at the same time that the software upgrades occur, applying to the same offline hosts. This process is explained in more detail with respect to FIG. 2.

Figure 2:
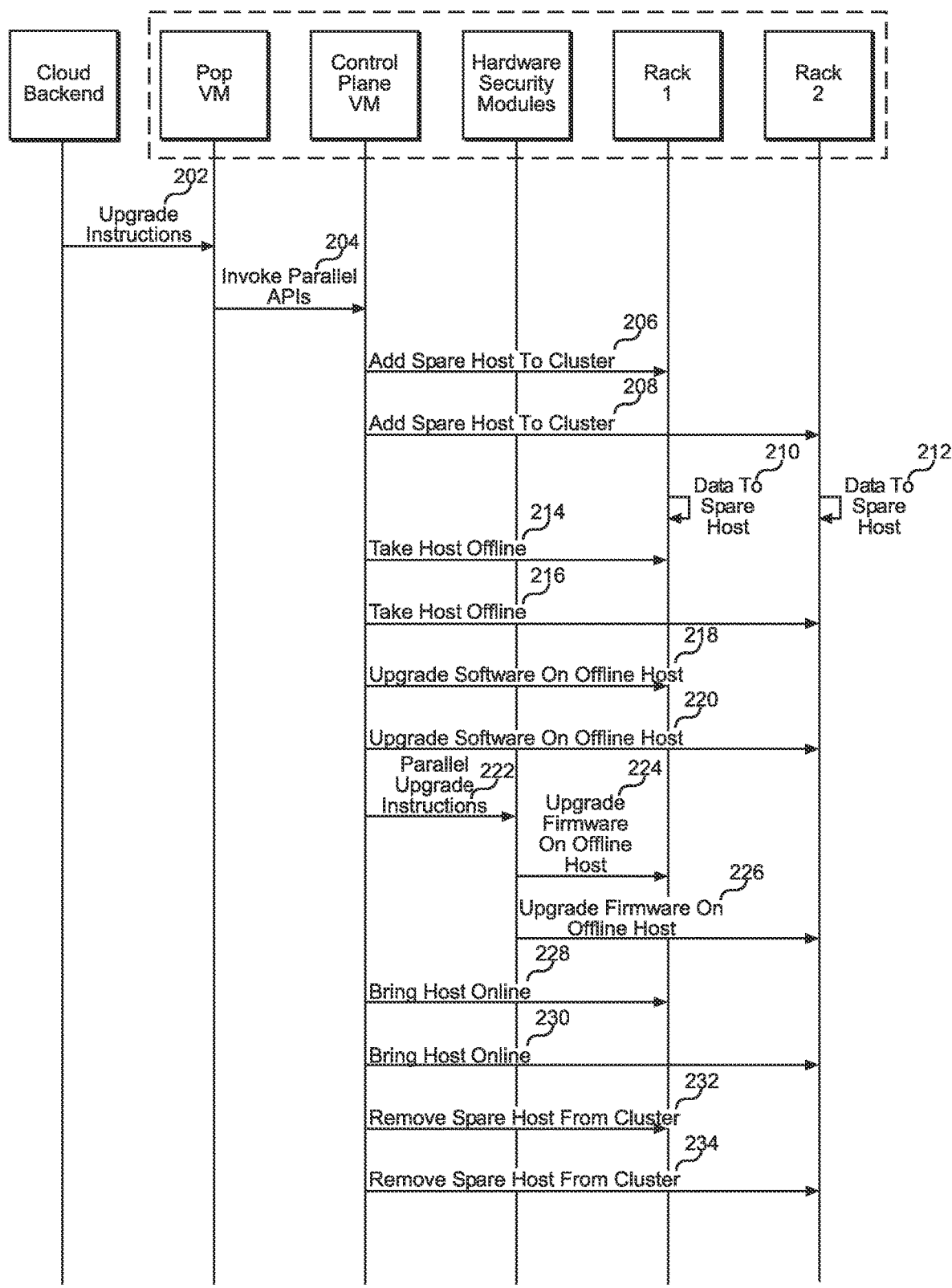
FIG. 2 is a sequence diagram of an example method for parallel upgrades of multiple hosts within an on-premises, multi-rack SDDC.

FIG. 2 provides a sequence diagram of an example method for parallel upgrades of multiple hosts within an on-premises, multi-rack SDDC. At stage 202, a cloud backend can provide upgrade instructions to the POP VM of the SDDC, as also explained with respect to stage 110 of FIG. 1. The POP VM can poll the cloud backend for instructions. In some examples, the POP VM polls at regular intervals, but it can also poll in response to a notification received at the POP VM. The cloud backend can be a remote server or group of servers that provides backend services to the SDDC. In some examples, the cloud backend is operated by a third party different from the customer running the SDDC itself.

The instructions received at stage 202 can include instructions to upgrade the SDDC. For example, the instructions can identify specific software and/or firmware upgrades to be applied. In some examples, the instructions include one or more upgrade files. In another example, the instructions provide a location, such as a URL, where the upgrade files are stored. The POP VM, or any other appropriate component of the SDDC, can then retrieve the upgrade files from the URL. The instructions can also include an identification of specific components in the SDDC to be upgraded. For example, the instructions can identify particular racks, clusters, and hosts to be upgrade. They can also map each component to the specific upgrade to be applied. The instructions can also specify an upgrade order, including instructions to perform certain upgrades in parallel by applying them at the same time.

At stage 204, the POP VM can invoke parallel APIs of the control plane VM. In some examples, this stage includes invoking a single API of the control plane VM, such as a pod service executing on the control plane VM. The pod service can be a service executing on the control plane VM that can perform various functionality. In one example, the pod service includes API functionality such that another entity, such as the POP VM, can invoke one or more APIs to carry out the instructions received at stage 202. In one example, the POP VM parses the instructions from stage 202 into multiple instructions to be performed in parallel. In those examples, the POP VM invokes multiple APIs of the pod service at stage 204 to communicate the parallel instructions.

In another example, the POP VM invokes a single API to provide the instructions as one package, and the pod service is responsible for breaking down the instruction set into discrete, parallel instructions. In that example, the pod service can then generate the parallel API calls to a lifecycle management service of the control plane VM. As explained with respect to stage 130 of FIG. 1, the control plane VM can generate a set of instructions for performing cluster upgrades in parallel. The instructions can identify a plurality of clusters of the SDDC, such as multiple clusters operating on separate physical racks of the datacenter. In some examples, this stage is performed by the pod service. In another example, the pod service invokes parallel APIs of a lifecycle management service that can also be executing on the control plane VM. The lifecycle management service can include functionality for performing upgrades, either directly or by instructing other components of the SDDC to perform the upgrades. In FIG. 2, the pod service and lifecycle management service are collectively referred to as the control plane VM.

At stage 206, the control plane VM can add a spare host to rack 1, which can be one of several physical racks in the datacenter. Typical on-premises, multi-rack datacenters ship with multiple racks that include one spare host on each rack. While certain cloud-based datacenters do not include limitations on the number of spare hosts that can be utilized, an on-premises datacenter must include the spare hosts within the physical rack in order to utilize it. To save on customer costs, each rack typically includes only one spare host. At stage 206, the control plane can identify a cluster of rack 1 to be upgraded and add the spare host of rack 1 to that cluster. Similarly, at stage 208, the control plane VM can add the spare host of rack 2 to a cluster to be upgrade in rack 2. Stages 206 and 208 can be performed simultaneously in some examples.

At stage 210, the control plane VM can cause data to be moved from one or more hosts of the target cluster to the spare host that was added to the cluster at stage 206. In some examples, the spare host can take over all duties being performed by another host in the target cluster, such that the other host can be taken offline without any degradation of performance or services to the customer. At stage 212, the control plane VM can cause data to be moved from a different host of a cluster on rack 2 to the spare host added to that cluster at stage 208. Stages 210 and 212 can be performed simultaneously, allowing multiple spare hosts to be added to multiple clusters on different racks at the same time. Previously this was not possible—instead, only one host from one rack could be utilized at a time, even if the datacenter included multiple racks that each included a spare host. This led to inefficiencies as upgrades were performed serially instead of in parallel.

At stages 214 and 216, the control plane VM can cause at least one host on each of rack 1 and rack 2 to be taken offline. For example, the hosts that were migrated to the spare hosts on each rack can be the ones taken offline, meaning that they do not interface with the other components of the SDDC and may be powered off or restarted. Because the data from these hosts is migrated to the spare hosts, the spare hosts can provide seamless operation of the SDDC even when the original hosts are taken offline. In some examples, stages 214 and 216 are performed at the same time, also referred to as being performed in parallel.

While the hosts from rack 1 and rack 2 are offline, at stages 218 and 220 the control plane VM upgrades the software of those hosts. In some examples, the lifecycle management service can perform software upgrades directly. For example, the lifecycle management service can send one or more software upgrade packages to each of the offline hosts and instruct them to apply the upgrades. The instructions can also include instructions to reboot the offline hosts. While these instructions are provided separately to the different offline hosts, they can be sent simultaneously (or at least sent to both offline hosts before any of those hosts have completed their upgrade), thereby providing parallel software upgrades.

At stage 222, the control plane VM can initiate firmware upgrades on the offline hosts. For example, stage 222 can include providing parallel upgrade instructions to hardware security modules associated with relevant clusters. An example hardware security module can execute on a manager VM associated with each cluster. The lifecycle management service can therefore instruct multiple hardware security modules of the clusters containing the offline hosts to perform firmware upgrades simultaneously. In some examples, these firmware upgrade instructions occur while the software upgrades occur, applying to the same offline hosts. In other examples, the firmware instructions are provided earlier in the method, such as before stage 218.

Hardware security modules can be specialized hardware devices used for secure key management, cryptographic operations, and secure storage of sensitive information such as passwords, encryption keys, and digital certificates within the SDDC. In some examples, hardware security modules are integrated into an appliance, such as the manager VM or VMWARE VXRAIL, to provide additional security for the SDDC. These hardware security modules are designed to protect the appliance against various security threats, including unauthorized access, data breaches, and malware attacks. They can provide secure key storage and management, which is essential for many security applications such as digital signing, authentication, and encryption. They can also provide secure boot capabilities, which ensures that the manager VM boots up only with authorized software and firmware.

The hardware security modules can perform firmware upgrades of the offline hosts at stages 224 and 226. In some examples, these stages are performed at the same time or at least in an overlapping manner. In some examples, stages 224 and 226 are performed before the software upgrades at stages 218 and 220.

After the software and firmware upgrades are complete, the control plane VM can bring the upgraded hosts back online at stages 228 and 230, respectively. At stages 232 and 234, the spare hosts can migrate their data back to the original hosts, which have now been upgraded. The spare hosts can then be used to upgrade other hosts in the same clusters or be moved to new clusters to assist with upgrades of hosts in those clusters.

Figure 3:
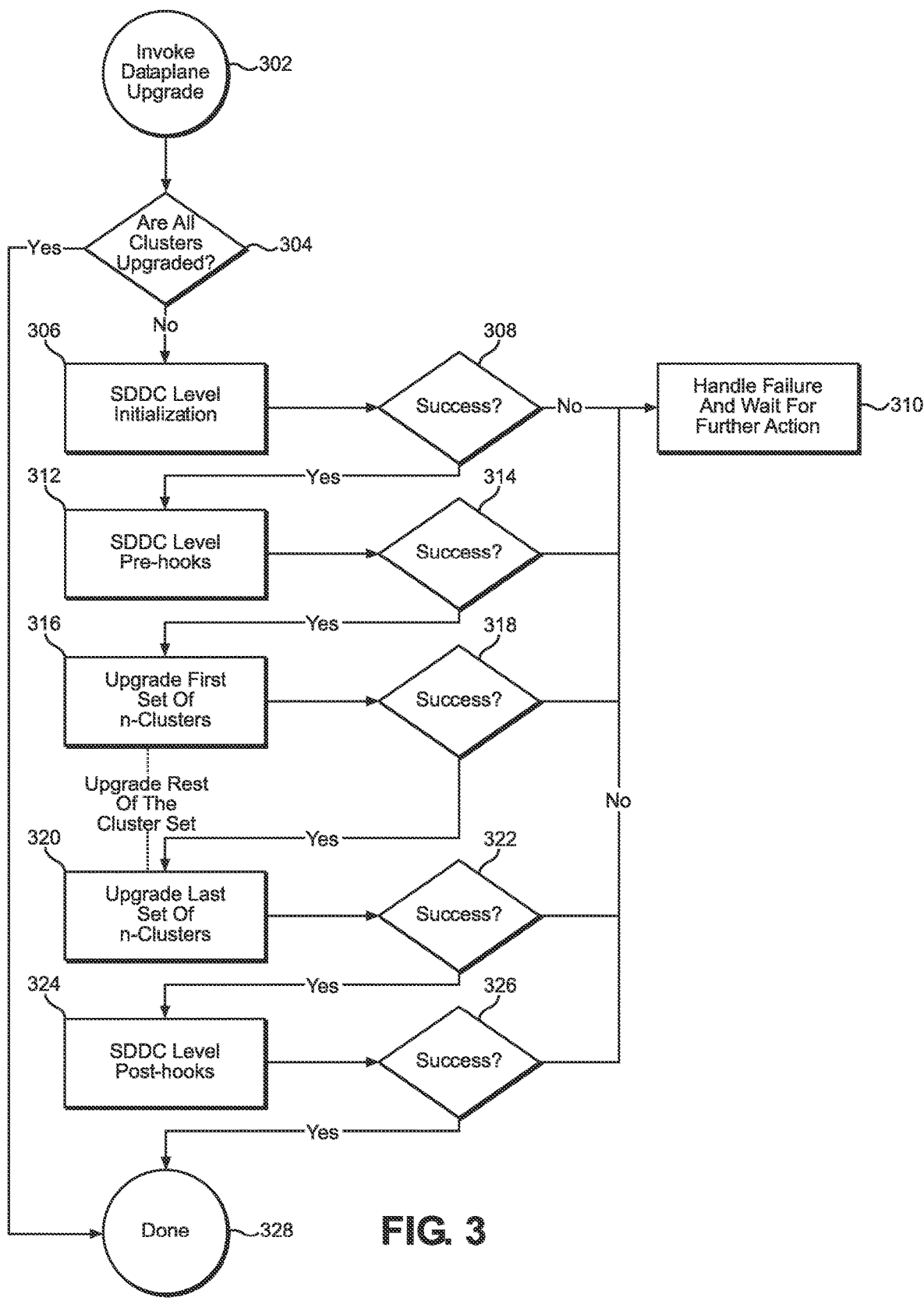
FIG. 3 is a flowchart of an example method for parallel upgrades of multiple hosts within an on-premises, multi-rack SDDC.

FIG. 3 provides a flowchart of an example method for parallel upgrades of multiple hosts within an on-premises, multi-rack SDDC. The example method begins at stage 302, where a data plane upgrade is invoked. This stage can include the POP VM receiving upgrade instructions from a cloud backend and invoking parallel APIs at a control plane VM, for example.

At stage 304, the control plane VM can determine whether all clusters are upgraded. If so, the process can end at stage 328. If not, the method can continue to stage 306 and perform SDDC level initialization as necessary. SDDC initialization can include initializing or setting up any aspect of the SDDC to perform upgrades. In one example, this stage includes powering on one or more spare hosts in the SDDCs. For example, in a three-rack SDDC where each rack includes one spare host, the spare hosts can remain dormant in a powered-down state until they are needed. This saves on energy costs. When they are needed, the spare hosts can be powered up and initialized as necessary, such as by installing software or firmware, migrating data, and applying settings or policies to the spare hosts.

If stage 306 is determined to be unsuccessful at stage 308, then the method can proceed to stage 310 where the failure is handled, and the system awaits instructions for further actions. If stage 308 determines that the initialization was successful, then the method can proceed to stage 312. Stages 306 and 308 can be performed by the control plane VM, for example.

At stage 312, SDDC level pre-hooks are orchestrated by the control plane VM. These pre-hooks can include, for example, setting up a depot for the lifecycle management service; deleting data in an old depot, if one exists; clearing out the cache; and applying any lifecycle management service global policies. The pre-hooks can be executed only once at the SDDC level, such that the method does not require repeat execution when multiple clusters are being upgraded.

If stage 312 is determined to be unsuccessful at stage 314, then the method can proceed to stage 310 where the failure is handled, and the system awaits instructions for further actions. If stage 314 determines that the initialization was successful, then the method can proceed to stage 316.

At stage 316, the control plane VM can upgrade a first set of clusters in the SDDC. This can include, for example, the lifecycle management service can perform software upgrades directly. For example, the lifecycle management service can send one or more software upgrade packages to each of the offline hosts and instruct them to apply the upgrades. The instructions can also include instructions to reboot the offline hosts. While these instructions are provided separately to the different offline hosts, they can be sent simultaneously (or at least sent to both offline hosts before any of those hosts have completed their upgrade), thereby providing parallel software upgrades.

Stage 316 can also include firmware upgrades. For example, stage 316 can include providing parallel upgrade instructions to hardware security modules associated with relevant clusters. An example hardware security module can execute on a manager VM associated with each cluster. The lifecycle management service can therefore instruct multiple hardware security modules of the clusters containing the offline hosts to perform firmware upgrades simultaneously. In some examples, these firmware upgrade instructions occur while the software upgrades occur, applying to the same offline hosts.

Stage 316 can also include bringing the offline hosts back online and migrating data from the spare hosts back to the original, now-upgraded hosts. The spare hosts can also be used to migrate any other hosts of the clusters, such that stage 316 includes upgrading all hosts within the first set of clusters.

If stage 316 is determined to be unsuccessful at stage 318, then the method can proceed to stage 310 where the failure is handled, and the system awaits instructions for further actions. If stage 318 determines that the initialization was successful, then the method can proceed to stage 320.

Stage 320 can include repeating the process of step 316 for a second, third, or any other number of cluster sets. In an example where an SDDC includes three racks, each having five clusters, then each "set" of clusters can include one cluster from each rack. This will result in five sets of clusters that are upgraded in stages 316-320.

If stage 320 is determined to be unsuccessful at stage 322, then the method can proceed to stage 310 where the failure is handled, and the system awaits instructions for further actions. If stage 322 determines that the initialization was successful, then the method can proceed to stage 324.

At stage 324, the SDDC can perform post-hooks, which can include various checks and adjustments after upgrading is complete. This can include confirming that each host is upgraded and that the inventories for the hosts have been synchronized, performing a disk format conversion change, and performing any other required configuration changes. If stage 324 is determined to be unsuccessful at stage 326, then the method can proceed to stage 310 where the failure is handled, and the system awaits instructions for further actions. If stage 326 determines that the initialization was successful, then the method can end at stage 328. Stage 326 can be performed by the control plane VM, for example.

Figure 4:
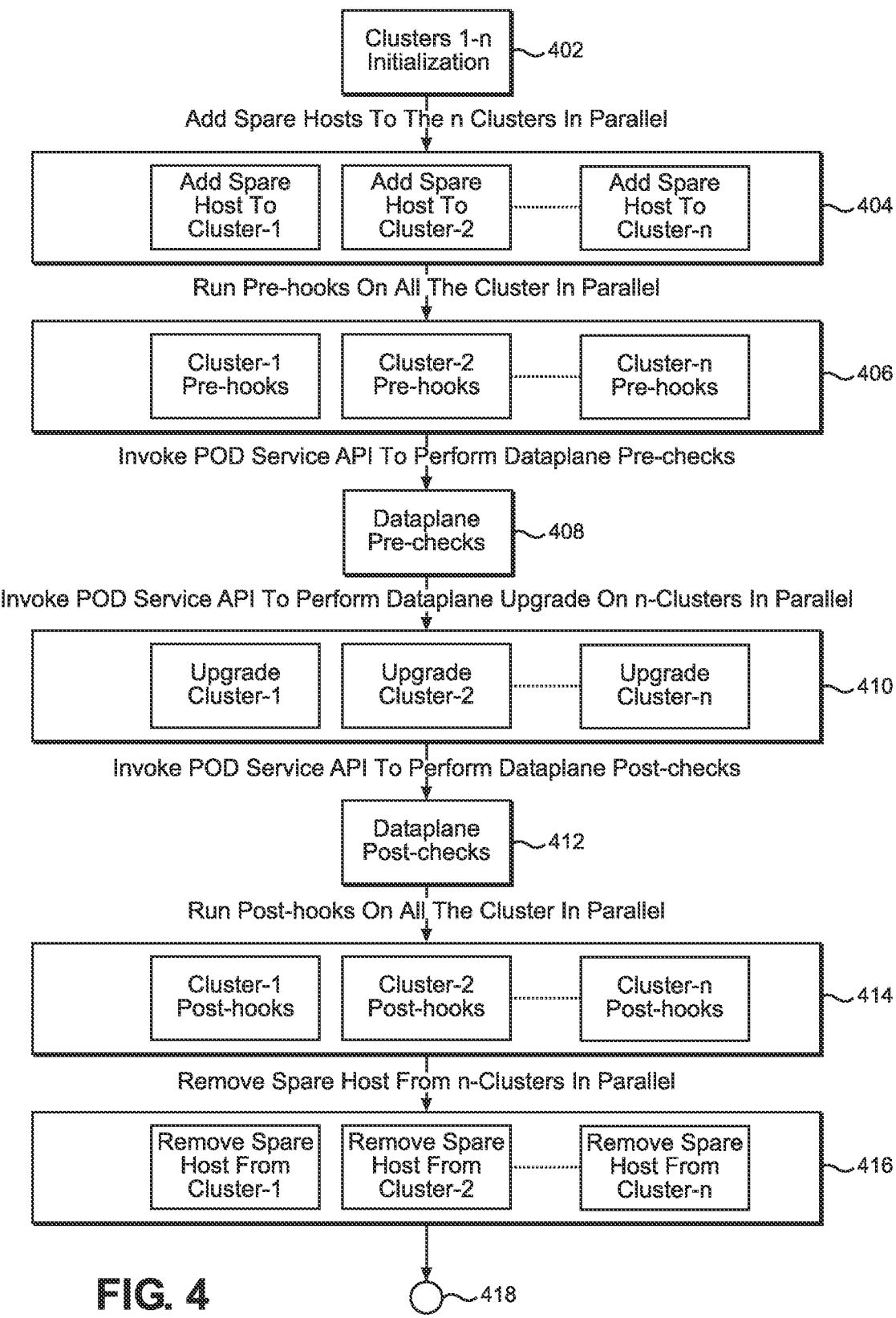
FIG. 4 is a flowchart of an example method for parallel upgrades of multiple hosts within an on-premises, multi-rack SDDC.

FIG. 4 provides a flowchart of an example method for parallel upgrades of multiple hosts within an on-premises, multi-rack SDDC. At stage 402, the SDDC can initialize clusters 1-n within the SDDC. In this example, clusters 1-n are distributed amongst at least three separate racks. This stage can include hardware setup, such as configuring the servers, switches, and storage devices of the SDDC. It can also include network configuration, such as setting up network adapters, VLANs, and other network settings required for communication between the hosts and VMs. It can further include cluster creation, such as installing hypervisor software on each host and configuring them to work together in a cluster. This stage can also include configuring storage infrastructure and deploying VMs to the clusters.

At stage 404, the spare hosts from each rack can be added to various clusters. In the examples described previously, each rack included one spare host. In those examples, the one spare host from each rack can be added to one cluster located on the respective rack. However, the systems and methods described herein are scalable such that any number of spare hosts can be utilized at the same time. For example, in a three-rack SDDC where each rack includes two spare hosts, both spare hosts of each rack can be added to clusters within that rack. The methods described above, such as the methods of FIGS. 1-3, can utilize multiple spare hosts to further increase the parallelism of the upgrade process. For example, stage 218 of FIG. 2 describes upgrading software on an offline host, where the offline host has been migrated to a spare host. In an example where the rack for that host includes two spare hosts, stage 218 can include upgrading software on two offline hosts in that rack, where the offline hosts have been migrated to the two spare hosts.

At stage 406, the SDDC can run pre-hooks on all clusters to be upgraded. These pre-hooks can be performed in parallel on the various clusters. Pre-hooks can include scripts or commands that are executed before a cluster operation is performed. These pre-hooks are designed to automate tasks that need to be performed before a cluster operation, such as adding or removing a host, updating the cluster configuration, or performing maintenance tasks. Some examples of pre-hooks include checking the health status of a host and configuring settings of the host, such as network settings, firewall rules, and storage settings.

At stage 408, the SDDC can invoke a pod service API to perform data plane pre-checks. These pre-checks can include tests to verify that the data plane of the SDDC is ready for use. The data plane is the part of the SDDC that handles the actual data traffic, such as VM network traffic or storage I/O. The purpose of data plane pre-checks is to ensure that the data plane is properly configured and functioning correctly before VMs or other workloads are deployed onto the SDDC. Invocation of the pod service using APIs is described in more detail with respect to stage 204 of FIG. 2, for example.

At stage 410, the SDDC can perform data plane upgrades on the clusters in parallel. These upgrades can include software and firmware upgrades in some examples. For example, the control plane VM upgrades the software of those hosts. In some examples, the lifecycle management service can perform software upgrades directly. For example, the lifecycle management service can send one or more software upgrade packages to each of the offline hosts and instruct them to apply the upgrades. The instructions can also include instructions to reboot the offline hosts. While these instructions are provided separately to the different offline hosts, they can be sent simultaneously (or at least sent to both offline hosts before any of those hosts have completed their upgrade), thereby providing parallel software upgrades.

Similarly, the control plane VM can initiate firmware upgrades on the offline hosts. For example, stage 410 can include providing parallel upgrade instructions to hardware security modules associated with relevant clusters. An example hardware security module can execute on a manager VM associated with each cluster. The lifecycle management service can therefore instruct multiple hardware security modules of the clusters containing the offline hosts to perform firmware upgrades simultaneously. In some examples, these firmware upgrade instructions occur while the software upgrades occur, applying to the same offline hosts. In other examples, the firmware instructions are provided earlier in the method.

At stage 412, the pod service can be invoked through an API call to perform data plane post-checks. The post-checks are tests that are performed after a workload has been deployed onto the SDDC to ensure that the data plane is functioning correctly. The purpose of data-plane post-checks is to verify that the data plane is performing as expected after a workload has been deployed. This helps ensure that the workload is operating correctly and that there are no issues with the SDDC infrastructure. These post-checks typically include tests of network connectivity, storage connectivity, security settings, and VM performance.

At stage 414, the SDDC can run post-hooks on the clusters in parallel. Post-hooks can be scripts or commands that are executed after a cluster operation has been performed. These hooks are designed to automate tasks that need to be performed after a cluster operation, such as adding or removing a host, updating the cluster configuration, or performing maintenance tasks. These post-hooks can include, for example, validating the configuration of the cluster, triggering additional tasks such as updating a backup schedule or performing additional maintenance tasks, checking the health status of the cluster to ensure it is functioning appropriately, and sending notifications.

At stage 416, the method can include removing the spare hosts from the clusters that were upgraded. This stage can be performed in parallel, such that the spare hosts are removed at approximately the same time. In an example system having three racks with two spare hosts per rack, the upgrade process can utilize all spare hosts as explained above. At stage 416, all sick spare hosts can be removed at the same time, such as by migrating their data back to the original hosts. The process can then end at stage 418 or repeat as needed until all relevant clusters and hosts are upgraded.

Figure 5:
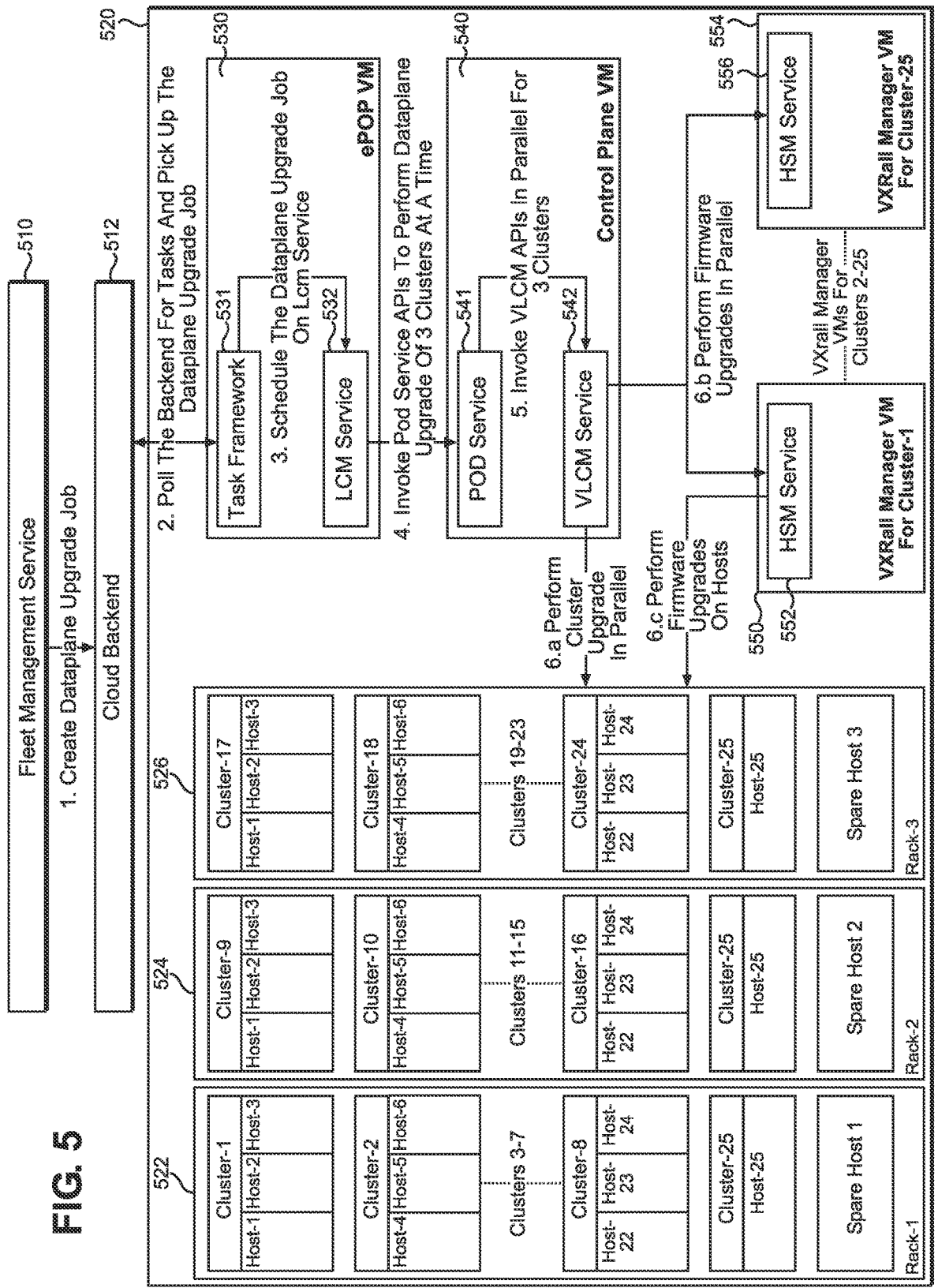
FIG. 5 is an illustration of an example system for performing the methods described herein.

FIG. 5 provides an illustration of an example system for performing the methods described herein. FIG. 5 depicts an SDDC 520 that includes three physical racks 522, 524, 526. Each rack 522, 524, 526 includes various clusters that each include one or more hosts. Each rack 522, 524, 526 also includes a spare host, although in some examples each rack can include more than one spare host. The SDDC 520 also includes a POP VM 530, a control plane VM 540, and multiple manager VMs 550, 554.

The POP VM 530 can be deployed at a strategic location in the SDDC infrastructure to optimize network performance and reduce latency by providing a local presence for network services. It can act as a gateway or hub for network traffic, such as instructions provided by a cloud backend. The POP VM 530 can provide services such as caching, load balancing, and content delivery to optimize network traffic and improve the user experience. It can also provide security functions such as intrusion detection and prevention, firewalls, and VPN gateways to secure network traffic.

The POP VM 530 can include a task framework service 531 and an LCM service 532, which can each be software services executing on the POP VM 530. The task framework service 531 can be a set of rules and procedures for managing and executing tasks within the POP VM 530. In some examples, the task framework service 531 can poll a cloud backend 512 for tasks. For example, a data plane upgrade job can be a task, or set or tasks, provided by the cloud backend 512 to the task framework service 531 of the POP VM 530. In some examples, the POP VM 530 polls at regular intervals, but it can also poll in response to a notification received at the POP VM 530. The cloud backend 512 can be a remote server or group of servers that provides backend services to the SDDC. In some examples, the cloud backend 512 is operated by a third party different from the customer running the SDDC itself.

The upgrade job received from the cloud backend 512 can be created at a fleet management service 510. In some examples, the fleet management service 510 is managed by the same entity that operates the cloud backend 512. For example, a third-party that provides SDDC infrastructure and management can operate the fleet management service 510. The fleet management service 510 can generate the data plane upgrade job and transmit it to one or more cloud backends 512 that support various SDDCs, including SDDC 520.

Turning back to the POP VM 530, the task framework service 531 can receive the data plane upgrade job and schedule it using a lifecycle management service 532. The lifecycle management service 532 of the POP VM 530 can determine when and how to apply the upgrades using information about the current state of the SDDC 520. For example, it can determine that the upgrades have not yet been applied to certain clusters or hosts within the SDDC 520. It can also determine how many spare hosts are available and whether parallel upgrades can be performed. It can invoke a pod service 541 of a control plane VM 540 using API calls or other communication techniques, instructing the pod service 541 to take actions to carry out the upgrade plane.

The pod service 541 can be a service executing on the control plane VM 540 that can perform various functionality. In one example, the pod service 541 includes API functionality such that another entity, such as the POP VM 530, can invoke one or more APIs to carry out the instructions received from the cloud backend 512. In one example, the POP VM 530 parses the instructions into multiple instructions to be performed in parallel. In those examples, the POP VM 530 invokes multiple APIs of the pod service 541 to communicate the parallel instructions.

In another example, the POP VM 530 invokes a single API to provide the instructions as one package, and the pod service 541 is responsible for breaking down the instruction set into discrete, parallel instructions. In that example, the pod service 541 can then generate the parallel API calls to a lifecycle management service 542 of the control plane VM 540. The control plane VM 540 can generate a set of instructions for performing cluster upgrades in parallel. The instructions can identify a plurality of clusters of the SDDC 520, such as multiple clusters operating on separate physical racks of the datacenter. In some examples, this stage is performed by the pod service 541. In another example, the pod service 541 invokes parallel APIs of a lifecycle management service 542 executing on the control plane VM 540. The lifecycle management service 542 can include functionality for performing upgrades, either directly or by instructing other components of the SDDC 520 to perform the upgrades.

The lifecycle management service 542 of the control plane VM 542 can perform parallel software upgrades of the clusters in the manner explained in various examples above. In some examples, the lifecycle management service can perform software upgrades directly. For example, the lifecycle management service can send one or more software upgrade packages to each of the offline hosts and instruct them to apply the upgrades. The instructions can also include instructions to reboot the offline hosts. While these instructions are provided separately to the different offline hosts, they can be sent simultaneously (or at least sent to both offline hosts before any of those hosts have completed their upgrade), thereby providing parallel software upgrades.

The lifecycle management service 542 of the control plane VM 542 can also initiate firmware upgrades on the offline hosts. For example, it can provide parallel upgrade instructions to hardware security modules 552, 554 associated with relevant clusters. An example hardware security module 552, 554 can execute on a manager VM 550, 554 associated with each cluster. The lifecycle management service 542 can therefore instruct multiple hardware security modules 552, 554 of the clusters containing the offline hosts to perform firmware upgrades simultaneously. In some examples, these firmware upgrade instructions occur while the software upgrades occur, applying to the same offline hosts.

Hardware security modules 552, 556 can be specialized hardware devices used for secure key management, cryptographic operations, and secure storage of sensitive information such as passwords, encryption keys, and digital certificates within the SDDC 520. In some examples, hardware security modules 552, 556 are integrated into an appliance, such as the manager VM or VMWARE VXRAIL, to provide additional security for the SDDC 520. These hardware security modules 552, 556 are designed to protect the appliance against various security threats, including unauthorized access, data breaches, and malware attacks. They can provide secure key storage and management, which is essential for many security applications such as digital signing, authentication, and encryption. They can also provide secure boot capabilities, which ensures that the manager VM 550, 556 boots up only with authorized software and firmware.

Figure 6:
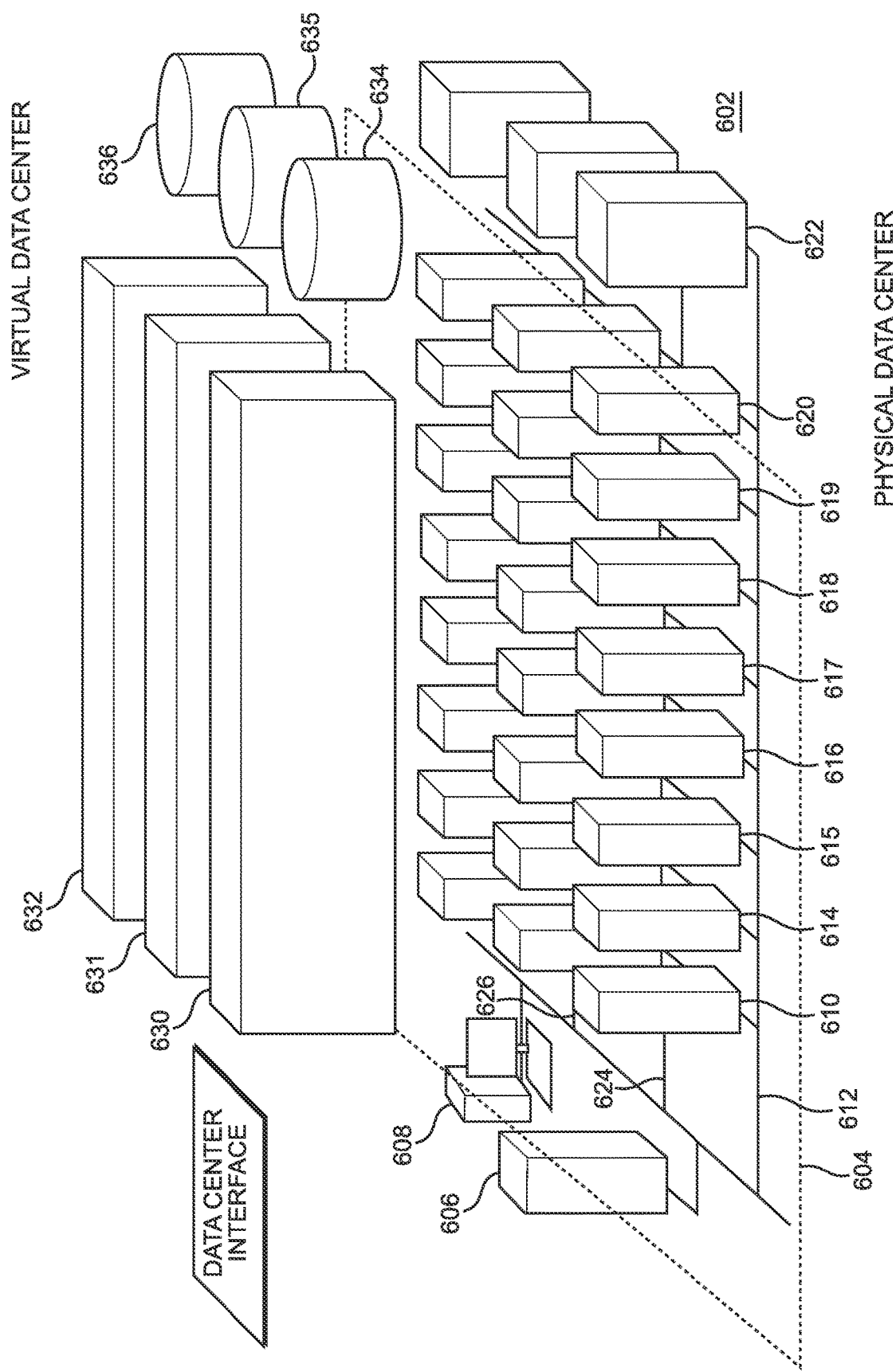
FIG. 6 is an illustration of an example SDDC for performing the methods described herein.

FIG. 6 provides an illustration of a simplified SDDC that can perform the various methods described herein. Specifically, FIG. 6 illustrates a virtual data center provided as an abstraction of underlying physical-data-center hardware components. In some examples, the virtualized data center is considered an SDDC. The virtualized data center can include various components described herein, such as the POP VM, control plane VM, manager VMs, and server racks. A physical data center 602 is shown below a virtual-interface plane 604. The physical data center consists of a virtual-infrastructure management server ("VI-management-server") 606 and any of various different computers, such as PCs 608, on which a virtual-data-center management interface can be displayed to system administrators and other users. The interface can be a software-based control system, such as VMWARE VCLOUD DIRECTOR.

The physical data center additionally includes a number of server computers, such as server computer 610, that are coupled together by local area networks, such as local area network 612 that directly interconnects server computer 610 and 614-620 and a mass-storage array 622. The physical data center shown in FIG. 6 includes three local area networks 612, 624, and 626 that each directly interconnects a bank of eight servers and a mass-storage array. The individual server computers, such as server computer 610, each includes a virtualization layer and runs multiple VMs. Different physical data centers can include many different types of computers, networks, data-storage systems and devices connected according to many different types of connection topologies. The virtual-data-center abstraction layer 604, a logical abstraction layer shown by a plane in FIG. 6, abstracts the physical data center to a virtual data center comprising one or more resource pools, such as resource pools 630-632, one or more virtual data stores, such as virtual data stores 634-636, and one or more virtual networks. In certain implementations, the resource pools abstract banks of physical servers directly interconnected by a local area network.

The virtual-data-center management interface allows provisioning and launching of VMs with respect to resource pools, virtual data stores, and virtual networks, so that virtual-data-center administrators need not be concerned with the identities of physical-data-center components used to execute particular VMs. Furthermore, the VI-management-server includes functionality to migrate running VMs from one physical server to another in order to optimally or near optimally manage resource allocation, provide fault tolerance, and high availability. It can migrate VMs to most effectively utilize underlying physical hardware resources, to replace VMs disabled by physical hardware problems and failures, and to ensure that multiple VMs supporting a high-availability virtual appliance are executing on multiple physical computer systems. This ensures the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the resources of individual physical servers and migrating VMs among physical servers to achieve load balancing, fault tolerance, and high availability.

The virtual data center provided by a service provider can be configured through a control system interface displayed on a user device, such as a computer or smartphone. In some examples, both the service provider and the tenants of that service provider can access certain configuration information through a GUI associated with the control system.

The SDDC of FIG. 6 can include multiple SDDC instances executing within the SDDC. For example, the SDDC can include an SDDC manager instance that operates on a standalone SDDC stack within the overall SDDC. Similarly, the SDDC can include an SDDC workflow instance that operates on another SDDC stack. The SDDC can include multiple SDDC manager instances and SDDC workflow instances, as described above.

Although examples described herein include systems and methods for dynamic VM provisioning across different cloud service providers, the same systems and methods can be applied for dynamic VM provisioning within a single cloud service provider. The examples or statements above relating to provisioning across cloud service providers are not intended to be limited regarding whether such provisioning is across different cloud service providers or within a single cloud service provider.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for upgrading a multi-rack, on-premises software defined data center (SDDC), comprising:
    receiving upgrade instructions at a point-of-presence (POP) virtual machine (VM) executing on the SDDC;
    generating, by a pod service, a set of instructions for performing cluster upgrades in parallel, wherein the set of instructions identifies a plurality of clusters of the SDDC located on separate racks; and
    performing a parallel upgrade of at least two of the identified plurality of clusters located on separate racks, wherein performing the parallel upgrade comprises:
        adding a spare host to each of the identified plurality of clusters, wherein each rack of the SDDC includes at least one spare host;
        transferring data from at least one host on each of the identified plurality of clusters to the spare host added to that cluster;
        taking the at least one host on each of the identified plurality of clusters offline;
        upgrading at least one of software and firmware on the offline hosts;

bringing the offline hosts online; and
removing the spare hosts from the identified plurality of clusters.

2. The method of claim 1, further comprising calling, by the POP VM, a first application programming interface (API) of the pod service executing on a control plane VM of the SDDC, the call including instructions to upgrade the plurality of clusters of the SDDC in parallel.

3. The method of claim 1, wherein upgrading comprises upgrading both software and firmware, and wherein the upgrading is performed in parallel on the offline hosts.

4. The method of claim 1, wherein upgrading firmware on the offline hosts is performed by hardware security modules executing on each of the identified plurality of clusters, respectively.

5. The method of claim 4, wherein the hardware security modules upgrade respective firmware based on instructions received from a lifecycle management service executing on a control plane VM of the SDDC.

6. The method of claim 1, wherein upgrading software on the offline hosts is performed by a lifecycle management service executing on a control plane VM of the SDDC.

7. The method of claim 1, wherein each rack includes only one spare host.

8. A non-transitory, computer-readable medium containing instructions that, when executed by a hardware-based processor, performs stages for upgrading a multi-rack, on-premises software defined data center (SDDC), the stages comprising:
receiving upgrade instructions at a point-of-presence (POP) virtual machine (VM) executing on the SDDC;
generating, by a pod service, a set of instructions for performing cluster upgrades in parallel, wherein the set of instructions identifies a plurality of clusters of the SDDC located on separate racks; and
performing a parallel upgrade of at least two of the identified plurality of clusters located on separate racks, wherein performing the parallel upgrade comprises:
adding a spare host to each of the identified plurality of clusters, wherein each rack of the SDDC includes at least one spare host;
transferring data from at least one host on each of the identified plurality of clusters to the spare host added to that cluster;
taking the at least one host on each of the identified plurality of clusters offline;
upgrading at least one of software and firmware on the offline hosts;
bringing the offline hosts online; and
removing the spare hosts from the identified plurality of clusters.

9. The non-transitory, computer-readable medium of claim 8, the stages further comprising calling, by the POP VM, a first application programming interface (API) of the pod service executing on a control plane VM of the SDDC, the call including instructions to upgrade the plurality of clusters of the SDDC in parallel.

10. The non-transitory, computer-readable medium of claim 8, wherein upgrading comprises upgrading both software and firmware, and wherein the upgrading is performed in parallel on the offline hosts.

11. The non-transitory, computer-readable medium of claim 8, wherein upgrading firmware on the offline hosts is performed by hardware security modules executing on each of the identified plurality of clusters, respectively.

12. The non-transitory, computer-readable medium of claim 11, wherein the hardware security modules upgrade respective firmware based on instructions received from a lifecycle management service executing on a control plane VM of the SDDC.

13. The non-transitory, computer-readable medium of claim 8, wherein upgrading software on the offline hosts is performed by a lifecycle management service executing on a control plane VM of the SDDC.

14. The non-transitory, computer-readable medium of claim 8, wherein each rack includes only one spare host.

15. A system for upgrading a multi-rack, on-premises software defined data center (SDDC), comprising:
a memory storage including a non-transitory, computer-readable medium comprising instructions; and
a computing device including a hardware-based processor that executes the instructions to carry out stages comprising:
receiving upgrade instructions at a point-of-presence (POP) virtual machine (VM) executing on the SDDC;
generating, by a pod service, a set of instructions for performing cluster upgrades in parallel, wherein the set of instructions identifies a plurality of clusters of the SDDC located on separate racks; and
performing a parallel upgrade of at least two of the identified plurality of clusters located on separate racks, wherein performing the parallel upgrade comprises:
adding a spare host to each of the identified plurality of clusters, wherein each rack of the SDDC includes at least one spare host;
transferring data from at least one host on each of the identified plurality of clusters to the spare host added to that cluster;
taking the at least one host on each of the identified plurality of clusters offline;
upgrading at least one of software and firmware on the offline hosts;
bringing the offline hosts online; and
removing the spare hosts from the identified plurality of clusters.

16. The system of claim 15, the stages further comprising calling, by the POP VM, a first application programming interface (API) of the pod service executing on a control plane VM of the SDDC, the call including instructions to upgrade the plurality of clusters of the SDDC in parallel.

17. The system of claim 15, wherein upgrading comprises upgrading both software and firmware, and wherein the upgrading is performed in parallel on the offline hosts.

18. The system of claim 15, wherein upgrading firmware on the offline hosts is performed by hardware security modules executing on each of the identified plurality of clusters, respectively.

19. The system of claim 18, wherein the hardware security modules upgrade respective firmware based on instructions received from a lifecycle management service executing on a control plane VM of the SDDC.

20. The system of claim 15, wherein upgrading software on the offline hosts is performed by a lifecycle management service executing on a control plane VM of the SDDC.

* * * * *